(12) United States Patent
Sprengard et al.

(10) Patent No.: US 12,421,653 B2
(45) Date of Patent: Sep. 23, 2025

(54) ELECTRICALLY-CONDUCTIVE BROAD GOOD

(71) Applicant: General Nano LLC, Cincinnati, OH (US)

(72) Inventors: Joseph E. Sprengard, Cincinnati, OH (US); Larry Allen Christy, Cincinnati, OH (US); Jae Hak Kim, Mason, OH (US)

(73) Assignee: General Nano LLC, Cincinnati, OH (US)

( * ) Notice: Subject to any disclaimer, the term of this patent is extended or adjusted under 35 U.S.C. 154(b) by 381 days.

(21) Appl. No.: 17/084,537

(22) Filed: Oct. 29, 2020

(65) Prior Publication Data

US 2021/0131026 A1    May 6, 2021

Related U.S. Application Data

(60) Provisional application No. 62/927,264, filed on Oct. 29, 2019.

(51) Int. Cl.
*D06M 11/83*  (2006.01)
*B32B 5/02*  (2006.01)
(Continued)

(52) U.S. Cl.
CPC .......... *D06M 11/83* (2013.01); *D04H 1/4234* (2013.01); *D10B 2401/16* (2013.01)

(58) Field of Classification Search
CPC ... B64D 45/02; D06M 11/83; D10B 2401/16; B32B 15/14; B32B 5/022; B32B 15/043; B32B 2260/021
See application file for complete search history.

(56) References Cited

U.S. PATENT DOCUMENTS 4,169,911 A   10/1979   Yoshida et al.
4,522,889 A   6/1985   Ebnerth et al.
(Continued)

FOREIGN PATENT DOCUMENTS

CN   1130223 A   9/1996
EP   0 109 638   5/1984
(Continued)

OTHER PUBLICATIONS

International Search Report and Written Opinion dated Feb. 25, 2021, in related International Application No. PCT/US2020/058051 filed Oct. 29, 2020 (9 pages).

(Continued)

*Primary Examiner* — Joanna Pleszczynska
(74) *Attorney, Agent, or Firm* — Daniel E. Nesbitt; Nesbitt IP LLC

(57) ABSTRACT

A electrically-conductive broad good having an electrically-conductive nonwoven veil comprising with a plurality of metal-coated fibers looped randomly throughout the nonwoven veil and a binder material binding the plurality of metal-coated fibers together into the nonwoven veil and a first metal coating covering the conductive nonwoven veil wherein the first metal coating increases the number of electrical interconnections between the plurality of metal-coated carbon fibers within the conductive nonwoven veil and increases the conductivity and ampacity of the plurality of metal-coated fibers.

18 Claims, 6 Drawing Sheets

(51) Int. Cl.
*B32B 15/04* (2006.01)
*B32B 15/14* (2006.01)
*B64D 45/02* (2006.01)
*D04H 1/4234* (2012.01)

(56) References Cited

U.S. PATENT DOCUMENTS

| | | | |
|---|---|---|---|
| 4,546,033 A | 10/1985 | Tsuchimoto et al. | |
| 4,752,415 A | 6/1988 | Iwaskow et al. | |
| 4,882,089 A * | 11/1989 | Iwaskow | D04H 1/435 |
| | | | 252/502 |
| 7,208,115 B2 | 4/2007 | Sheridan et al. | |
| 2005/0039937 A1 | 2/2005 | Yeh et al. | |
| 2010/0203789 A1 | 8/2010 | Takebayashi et al. | |
| 2011/0017867 A1 | 1/2011 | Simmons et al. | |
| 2013/0048331 A1 * | 2/2013 | Fornes | B64D 45/02 |
| | | | 174/2 |
| 2014/0011414 A1 | 1/2014 | Kruckenberg et al. | |
| 2014/0080378 A1 | 3/2014 | Wasynczuk | |
| 2014/0151111 A1 | 6/2014 | Shah et al. | |
| 2016/0319471 A1 | 11/2016 | Lee et al. | |
| 2017/0204519 A1 | 7/2017 | Kwag et al. | |
| 2017/0291332 A1 * | 10/2017 | Braley | B32B 3/266 |

FOREIGN PATENT DOCUMENTS

| | | |
|---|---|---|
| EP | 0 629 549 | 12/1994 |
| EP | 3178966 A1 | 6/2017 |
| EP | 3235632 A1 | 10/2017 |
| JP | H11220283 A | 8/1999 |
| JP | 2005059580 A | 3/2005 |
| JP | 2008255415 A | 10/2008 |
| JP | 2011519749 A | 7/2011 |
| JP | 2017526816 A | 9/2017 |
| WO | 2010120426 | 10/2010 |
| WO | 2015093777 | 6/2015 |
| WO | 2016010287 A1 | 1/2016 |
| WO | 2019018754 | 1/2019 |

OTHER PUBLICATIONS

International Search Report and Written Opinion of the International Searching Authority dated Dec. 17, 2018 for corresponding International Application No. PCT/US2018/043069, filed Jul. 20, 2018 (13 pages).

TFP Ltd., "Optimat® Technical Data Sheet—20404E Nickel Coated Carbon Mat", Technical Fibre Products Inc., Jan. 2015 (2 pages).

TFP Ltd., "Optimat® Technical Data Sheet—20444A Copper & Nickel Coated Carbon Mat", Technical Fibre Products Inc., Jan. 2015 (2 pages).

TFP Ltd., "Electrical Conductivity & Resistivity", brochure obtained at the Technical Fibre Products Inc. booth during The Composites and Advanced Materials EXPO (CAMX), Anaheim, CA on Aug. 26, 2019 (1 page).

TFP Ltd., "Metal Coated Veils and Mats", Oct. 21, 2016, Technical Fibre Products Inc., obtained from the Wayback Machine, http://web.archive.org/web/20161021025831/http://www.tfpglobal.com:80/materials/metal-coated (2 pages).

Di Bari, George A., "Chapter 3—Electrodeposition of Nickel", Modern Electroplating, $5^{th}$ ed., 2010, pp. 79-114 (36 pages).

SAE Aerospace, "ARP5414 Rev. A—Aircraft Lightning Zone", Aerospace Recommended Practice, SAE International, 2012 (33 pages).

Abys, Joseph A., "Chapter 12—Palladium Electroplating", Modern Electroplating, 5th ed., 2010, 327-368 (42 pages).

Krulik, G.A., *Tin-Palladium Catalysts for Electroless Plating*, 26 Platinum Metals Review 58-64, 1982 (7 pages).

U.S. Appl. No. 16/632,736, filed Jul. 20, 2018, General Nano LLC.

* cited by examiner

ELECTRICALLY-CONDUCTIVE BROAD GOOD

CROSS-REFERENCE TO RELATED APPLICATION

The present application claims the benefit of U.S. Provisional Application No. 62/927,264, filed Oct. 29, 2019, the disclosure of which is hereby incorporated by reference in its entirety.

TECHNICAL FIELD

The present disclosure is related to composite materials and, more particularly, to a broad good that is electrically-conductive.

BACKGROUND OF THE INVENTION

Aerospace vehicles are being designed and manufactured with greater percentages of composite materials. For example, composites can be used in the construction of various primary and secondary structures in aerospace applications, such as composite panels forming the airframe and/or exterior skin, e.g., fuselage, wings, etc., of an aircraft. Use of composites can increase the strength, decrease the weight, provide functional performance properties, and provide a longer service life of various components of the aerospace vehicle.

However, aerospace vehicles having composite components, such as skin panels, can require application of additional materials, for example, metal foils or wire meshes, for lightning strike protection and/or to shield associated avionics and electronics from external electromagnetic interference. Such additional materials, e.g., metal foils or wire meshes, can undesirably increase the weight of the aerospace vehicle and increase the time and cost of production.

Airplane lightning-strike zones are defined by SAE Aerospace Recommended Practices (ARP) 5414 (see FIG. 8). Some zones are ore prone to lightning strikes than others (see FIG. 9). Lighting-strike entrance and exit points are usually found in Zone 1, but can very rarely occur in Zones 2 and 3. A lightning strike usually attaches to the airplane in Zone 1 and departs from a different Zone 1 area. The external components most likely to be hit are: radomes, nancelles, wing tips, horizontal stabilizer tips, elevators, vertical fin tips, ends of the leading edge flaps, trailing edge flap track fairings, landing gear, water wasxte masts, and air data sensors, e.g., pitot probes, static ports, angle of attack vanes, and total air temperature probes.

Further, some other approaches to providing lightning strike protection have come up short in critical areas of aerospace vehicles such as those surfaces where a first return is likely during lightning channel attachment with a low expectation of flash hang on, e.g., a first return strike zone, defined as Zone 1A by SAE Aerospace Recommended Practices 5414. For example, one approach to making a conductive composite material has been to take metalized carbon fibers or tows, carbon fibers coated with nickel, copper and nickel or, some other metal or combination of metals, or a metal alloy, for example, nickel and iron (Ni/Fe), copper and tin (Cu/Sn), or phosphor bronze (Cu/Sn/P), cut or chop the coated fibers to a length of 0.1 millimeters (mm) up to 50.8 millimeters or more (mm), and form additively by bonding, a carbon fiber veil to be used in the construction of an airframe skin. When constructed in this manner, the chopped fibers create, in effect, a discontinuous metal structure with a sheet resistance that is too high to provide effective lightning strike protection in critical areas such as Zone 1A and further, the conductive composite material lacks the current carrying capability required by such an application.

Accordingly, those skilled in the art continue with research and development efforts in the field of composite materials and, more particularly, electrically-conductive broad goods.

SUMMARY OF THE INVENTION

The present invention relates to an electrically-conductive broad good, comprising a dimensionally-stable electrically-conductive nonwoven veil comprising metal-coated fibers bonded together with a binder, and having at least one metal coating covering the surface of the nonwoven veil.

An embodiment <A> provides an electrically-conductive broad good, comprising: (A) a dimensionally-stable electrically-conductive nonwoven veil comprising: (i) a plurality of metal-coated fibers having a staple length looped randomly throughout the nonwoven veil, wherein the metal of the metal-coated fibers is selected from the group consisting of nickel, copper, silver, an alloy of nickel and iron (Ni/Fe), an alloy of copper and tin (Cu/Sn), an alloy of phosphor bronze (Cu/Sn/P), and a combination thereof, and preferably nickel and copper, and wherein the fibers are preferably carbon fibers; and (ii) a binder material binding the plurality of metal-coated fibers together to form the dimensionally-stable electrically-conductive nonwoven veil; and (A) a first metal coating covering at least a portion of, and preferably substantially all of, the surface of the plurality of metal-coated fibers and the binder material, wherein the first metal coating forms an electrically-conductive pathway over the surfaces of the binder material and the plurality of metal-coated fibers that are bound together by the binder material; and (B) an optional second metal coating covering at least a portion of, and preferably substantially all of, the surface of the first metal coating.

In various embodiments <B>, in the electrically-conductive broad good of <A>, the staple length of the fibers is at least 0.1 millimeters (mm) and up to 50.8 millimeters (mm). In various embodiments <C>, the electrically-conductive broad good of <A> or <B> has a width of at least 12 inches (30.48 centimeters), and preferably up to 65 inches (165 centimeters). In various embodiments <D>, in the electrically-conductive broad good of any one of <A> through <C>, the binder material is selected from the group consisting of a butyl styrene, a polyester, a poly vinyl alcohol (PVA), a polyurethane, a phenoxy, and an epoxy, and a combination thereof In various embodiments <E>, in the electrically-conductive broad good of any one of <A> through <D>, the basis weight of the electrically-conductive broad good is up to 160 g/m$^2$, and a sheet resistance of the electrically-conductive broad good is at least 5 mΩ/□, preferably at least 10 mΩ/□. In various embodiments <F>, in the electrically-conductive broad good of any one of <A> through <D>, the metal of the metal-coated fibers is at least one of (i) nickel and (ii) copper and then nickel, and the basis weight of the nonwoven veil is at least 10 g/m$^2$ and up to 40 g/m$^2$ the basis weight of the electrically-conductive broad good is less than 80 g/m$^2$, and the sheet resistance of the electrically-conductive broad good is less than 5 mΩ/□. In various embodiments <G>, in the electrically-conductive broad good of any one of <A> through <F>, the dimensionally stable electrically-conductive nonwoven veil has a first sheet resistance and the electrically-conductive broad good having a second sheet resistance associated with the first metal coating having been applied to the dimensionally stable electrically-conductive nonwoven veil, wherein the first metal coating includes a coating of metal sufficient that the second sheet resistance is less than the first sheet resistance by a factor of 1,000 or more.

In various embodiments <H>, in the electrically-conductive broad good of any one of <A> through <G>, the second metal coating at least one of (a) forms a further electrically-conductive pathway over the binder material of the nonwoven veil and between the at least two metal-coated fibers that are bound together by the binder material but not in electrical contact, (b) forms a further electrically-conductive pathway over the binder material and between the at least two metal-coated fibers that are in electrical contact with each other and bound together by the binder material and further reduces the contact resistance between the at least two metal-coated fibers, and (c) further reduces the contact resistance between at the least two metal-coated fibers that are in electrical contact with each other but are not bound together by the binder material; and wherein the second metal coating further increases at least one of the conductivity and the ampacity of the plurality of metal-coated carbon fibers.

In various embodiments <I>, in the electrically-conductive broad good of any one of <A> through <G>, the second metal coating comprises an electroplated (EP) metal, preferably a nickel sulfamate based electroplated (EP) nickel, and more preferably the second metal coating covers, and preferably completely covers, the surface of the first metal coating.

In various embodiments <J>, in the electrically-conductive broad good of any one of <A> through <I>, the first metal coating comprises copper and contributes a basis weight of approximately 10-50 g/m$^2$ to the resulting electrically-conductive broad good, and the second metal coating comprises nickel and contributes a basis weight of approximately 5-20 g/m$^2$ to the resulting electrically-conductive broad good. In various embodiments <K>, in the electrically-conductive broad good of any one of <A> through <J>, a shielding effect provided by the electrically-conductive broad good is at least 1 GHz and up to 8.5 GHz, and is at least 40 decibels (dB), including at least 50 dB.

In various embodiments <L>, the electrically-conductive broad good of any one of <A> through <K> can further comprise a resin system, the electrically-conductive broad good pre-impregnated with the resin system. In various embodiments <M>, in the electrically-conductive broad good of <L>, the resin system is selected from the group consisting of a polybismaleimide (BMI), an epoxy, a polyamide, a thermoplastic, and a combination thereof.

In various embodiments <N>, in the electrically-conductive broad good of any one of <A> through <M>, the nonwoven veil has at least one of (a) the binder material binding at least two metal-coated fibers together that are not in electrical contact with each other, (b) the binder material binding at least two metal-coated fibers together that are in electrical contact with each other, and (c) at least two metal-coated fibers in electrical contact with each other but not bound together by the binder material, and the first metal coating provides at least one of (a) forms an electrically-conductive pathway over the exposed surfaces of the binder material and between the at least two metal-coated fibers that are bound together by the binder material but not in electrical contact, (b) forms an electrically-conductive pathway over the exposed surfaces of the binder material and between the at least two metal-coated fibers that are in electrical contact with each other and bound together by the binder material and reduces the contact resistance between the at least two metal-coated fibers, and (c) reduces the contact resistance between the at least two metal-coated fibers that are in electrical contact with each other but are not bound together by the binder material. In various embodiments <O>, the electrically-conductive broad good of any one of <A> through <N>, is useful as a surface material in the construction of an aircraft, wherein electrically-conductive broad good either withstands or prevents structural damage to the aircraft surface from direct and indirect effects of a 200,000-ampere lightning strike that either directly attaches to the aircraft or occurs nearby, and can endure an action integral of $2.0 \times 10^6 - 2.5 \times 10^6$ amps$^2$-second.

An embodiment of the present invention can provide an electrically-conductive broad good that includes a dimensionally-stable, electrically-conductive nonwoven veil comprising a plurality of metal-coated fibers looped randomly throughout the conductive nonwoven veil and a binder material binding the plurality of metal-coated fibers together into the conductive nonwoven veil; and a first metal coating that covers at least a portion of the surface of the plurality of metal-coated fibers and the binder material. Three arrangements of the fibers are possible. In a first arrangement, binder material binds two or more metal-coated fibers are bound together with the binder material and are not in electrical contact with each other. In a second arrangement, two or more metal-coated fibers are bound together with the binder material into electrical contact with each other. In a third arrangement, two or more metal-coated carbon fibers are in electrical contact with each other but not bound together by the binder material. In some embodiments, the first metal coating can form an electrically-conductive pathway over the surface of the binder material, over and between the surfaces of the metal-coated fibers that are bound together by the binder material but not in electrical contact. In some embodiments, the first metal coating forms an electrically-conductive pathway over the surface of the binder material, and over and between the surfaces of the two metal-coated fibers that are in electrical contact with each other and bound together by the binder material, and thereby reduces the contact resistance between fibers and reduces the contact resistance between fibers that are in electrical contact with each other but are not bound together by the binder material. The first metal coating also increases the conductivity and/or ampacity of the plurality of metal-coated fibers.

In some embodiments, the metal-coated fibers comprise carbon fibers.

In some embodiments, the staple length is about 0.1 millimeters (mm) up to about 50.8 millimeters (mm).

In some embodiments, the electrically-conductive broad good has a width of 12 inches (30.48 centimeters) or more, including 24 inches (about 61 centimeters) or more, 36 inches (about 94 centimeters) or more, 60 inches (about 152 centimeters) or more and 72 inches (about 183 centimeters) or more.

In some embodiments, the metal coating on the metal-coated fibers comprises one or more layers of at least one of nickel, copper, and silver or a combination thereof, an alloy, and a precious metal alloy including at least one of nickel and iron (Ni/Fe), copper and tin (Cu/Sn), and phosphor bronze (Cu/Sn/P).

In some embodiments, the binder material comprises a thermoset or thermoplastic polymer or at least one of a butyl styrene, a polyester, a poly vinyl alcohol (PVA), a polyurethane, a phenoxy, and an epoxy, and a combination thereof In some embodiments, the electrically-conductive nonwoven veil has a basis weight of approximately 4-100 g/m$^2$.

In some embodiments, the first metal coating comprises (i) an electrolessly plated metal and an electroplated (EP) metal or (ii) electroplated (EP) metal.

In another embodiment, the basis weight of the electrically-conductive broad good is more than 2 grams per square meter (g/m$^2$) or less than 160 g/m$^2$, or between about 2 g/m$^2$ and about 160 g/m$^2$.

In another embodiment, the basis weight of the electrically-conductive broad good is less than 160 g/m$^2$, the sheet resistance of the electrically-conductive broad good is between about 5-10 mΩ/□ or less than 10 mΩ/□, and the electrically-conductive broad good when used appropriately in the construction of an aircraft as a surface material is able to withstand and prevent structural damage to the aircraft surface from direct and indirect effects of a 200,000 ampere lightning strike which either directly attaches to the aircraft or occurs nearby and/or endures an action integral of $2.0 \times 10^6$-$2.5 \times 10^6$ Amps$^2$-second.

In another embodiment, the plurality of metal-coated carbon fibers comprise carbon fibers coated with nickel, and the basis weight of the plurality of nickel coated carbon fibers and the binder material is about 10-40 g/m$^2$, the basis weight of the electrically-conductive broad good is less than 80 g/m$^2$, and the sheet resistance of the electrically-conductive broad good is less than about 5 mΩ/□.

In some embodiments, the dimensionally stable electrically-conductive nonwoven veil has a first sheet resistance and the electrically-conductive broad good has a second sheet resistance associated with the first metal coating having been applied to the dimensionally stable electrically-conductive nonwoven veil, and the first metal coating includes enough metal to cause the second sheet resistance to be less than the first sheet resistance by a factor of 100, and preferably, 1,000 or more.

In another embodiment, any of the electrically-conductive broad goods of the above embodiments, further include a second metal coating covering the surface of the first metal coating. The second metal coating forms a further electrically-conductive pathway over the pathway of the first metal coating. The second metal coating also further increases the conductivity and/or ampacity of the nonwoven veil, and in particular, the plurality of metal-coated fibers.

In another embodiment, the second metal coating comprises an electroplated (EP) metal.

In another embodiment, the second metal coating comprises a nickel sulfamate based electroplated (EP) nickel.

In another embodiment, the first metal coating can comprise a first metal that can be corroded by either galvanic reaction with carbon or exposure to salt environments, and the second metal coating completely coats the first metal coating to prevent the galvanic reaction or the exposure of the first metal coating.

In another embodiment, the second metal coating covers, and preferably completely covers, the surface of the first metal coating.

In another embodiment, the first metal coating comprises copper and contributes a basis weight of approximately 10-50 g/m$^2$ to the resulting electrically-conductive broad good, and the second metal coating comprises nickel and contributes a basis weight of approximately 5-20 g/m$^2$ to the resulting electrically-conductive broad good.

In another embodiment, the dimensionally-stable electrically-conductive nonwoven veil has a first sheet resistance and the electrically-conductive broad good has a second sheet resistance associated with the first metal coating and the second metal coating having been applied to the dimensionally-stable electrically-conductive nonwoven veil, and the first and second metal coatings in combination include enough metal to cause the second sheet resistance to be less than the first sheet resistance by a factor of 100, and preferably, 1,000 or more.

In another embodiment, the plurality of metal-coated fibers comprise carbon fibers coated with at least one of (i) nickel and (ii) copper and then nickel, the basis weight of the basis weight of the conductive nonwoven veil is about 10-40 g/m$^2$, the basis weight of the electrically-conductive broad good is less than 80 g/m$^2$, and the sheet resistance of the electrically-conductive broad good is less than about 5 mΩ/□.

In another embodiment, the metal-coated fiber comprise carbon fibers coated with copper and then nickel, the basis weight of the conductive nonwoven veil is about 10-40 g/m$^2$, the basis weight of the electrically-conductive broad good is less than 80 g/m$^2$, and the shielding effect provided by the electrically-conductive broad good from 1-8.5 GHz is at least about 40, 50, 60, 70, or 80 decibels (dB).

In another embodiment, any of the electrically-conductive broad goods of the above embodiments, further comprise a resin system, the electrically-conductive broad good pre-impregnated with the resin system.

In some embodiments, the resin system includes a polybismaleimide (BMI), an epoxy, a polyamide, or a thermoplastic.

BRIEF DESCRIPTION OF THE DRAWINGS

Various embodiments of an electrically-conductive broad good offering lightning strike protection will become better understood with regards to the following description, appended claims and accompanying drawings wherein:

DETAILED DESCRIPTION OF THE INVENTION

Figure 1:
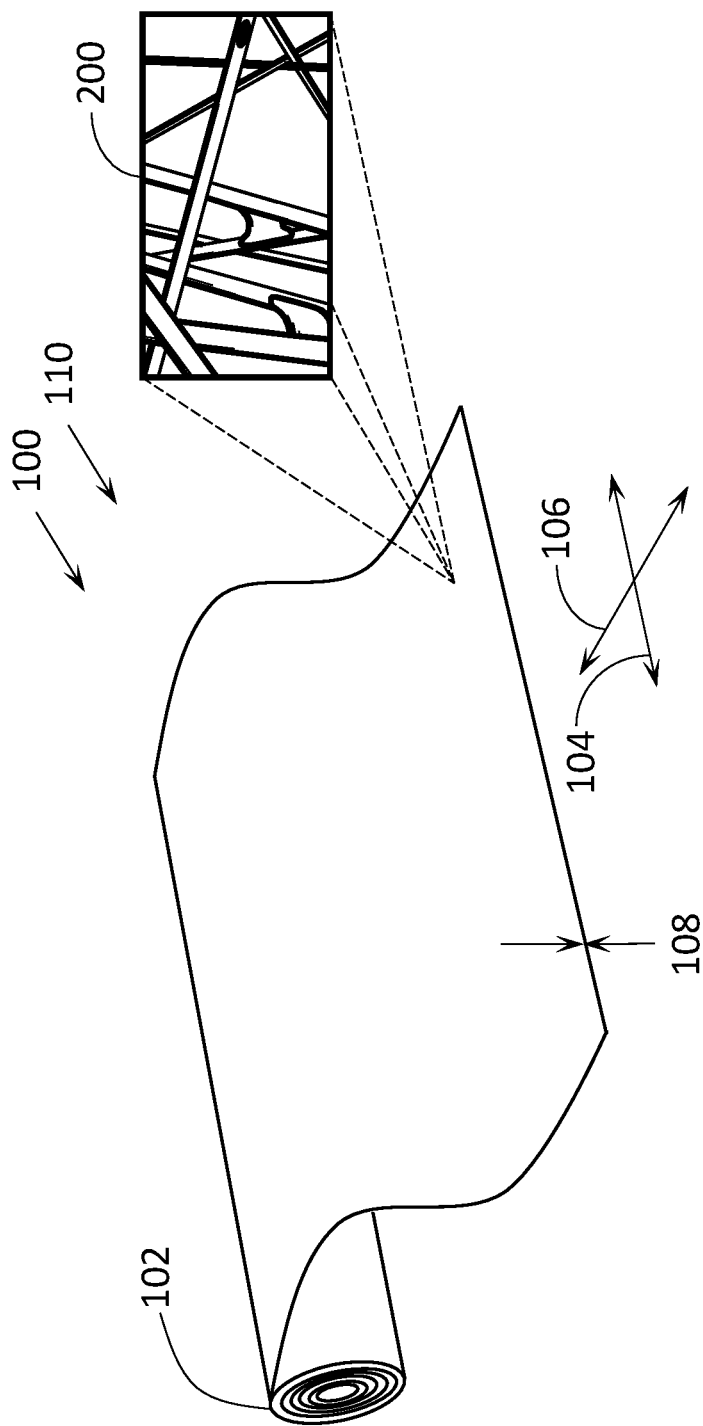
FIG. 1 is a perspective view of an electrically-conductive broad good in accordance with the present invention.

Referring to FIG. 1, a perspective view of an embodiment of an electrically-conductive broad good 100 in accordance with the present invention is shown. As depicted, the electrically-conductive broad good 100 can be manufactured and supplied in a roll 102, as is common in the composite material industry, having a width 104 and a length 106, typically specified in inches and yards (or centimeters and meters), respectively. Thus, when supplied, the width 104 of the electrically-conductive broad good 100 is generally much less than the length 106; however, in some other embodiments, this may not be the case. For example, in one embodiment, an electrically-conductive broad good can comprise an electrically-conductive broad good sheet.

More specifically, the width 104 can define the electrically-conductive broad good 100. As used hereinafter, an electrically-conductive broad good refers to standard and/or wider widths, especially in distinction from ribbons, bands, tows, or trimmings. The electrically-conductive broad good 100 typically has a width of 12 inches (about 30.5 cm) or more. For example, a purchaser of the electrically-conductive broad good 100 might buy a standard width of 3 inches to 36 inches (about 8 centimeters to 76 centimeters) based on the coverage needed for an aerospace application, such as an airframe and/or exterior skin, an aircraft fuselage, wings, etc., using automated tape layup and up to 60 inches (about 152 cm) in width for hand layup. Those of ordinary skill in the art will appreciate that the present invention is not limited to a specific width; but rather, the width 104 can be varied among standard and/or wider widths as desired without departing from the spirit of the present invention.

Further, a production line for manufacturing an electrically-conductive broad good 100 in accordance with the present invention can produce an electrically-conductive broad good 100 that is 12 inches (about 30.5 centimeters), 24 inches (about 61 centimeters), 36 inches (about 94 centimeters) or 60 inches (about 152 centimeters) wide.

The electrically-conductive broad good 100 also has a sheet thickness 108. In some embodiments, the sheet thickness 108 can be between about 25 micrometers (μm) as can be associated with 5-10 gram per square meter (g/m²) conductive nonwoven veil and about 500 micrometers (μm) as can be associated with a 100 gram per square meter (g/m²) conductive nonwoven veil. In the embodiment shown, the sheet thickness 108 is less than about 0.1 millimeters (mm) (0.040 inches), or on the order of 0.075 mm or 0.030 inches or 75 micrometers (μm) as can be associated with an about 70 gram per square meter (g/m²) conductive nonwoven veil, for example. Those of ordinary skill in the art will appreciate that as the thickness of the conductive nonwoven veil increases, so does the shielding effectiveness of the electrically-conductive broad good 100. Likewise, as the porosity of the conductive nonwoven veil increases or the areal weight decreases, i.e., a decrease in the material contained in the conductive nonwoven veil, i.e., the number of grams per square meter (g/m²) in the conductive nonwoven veil, the shielding effectiveness of the electrically-conductive broad good 100 also deceases as frequency increases. Thus, those of ordinary skill in the art will appreciate that the sheet thicknesses 108 can be varied as desired without departing from the spirit of the present invention.

Figure 2:
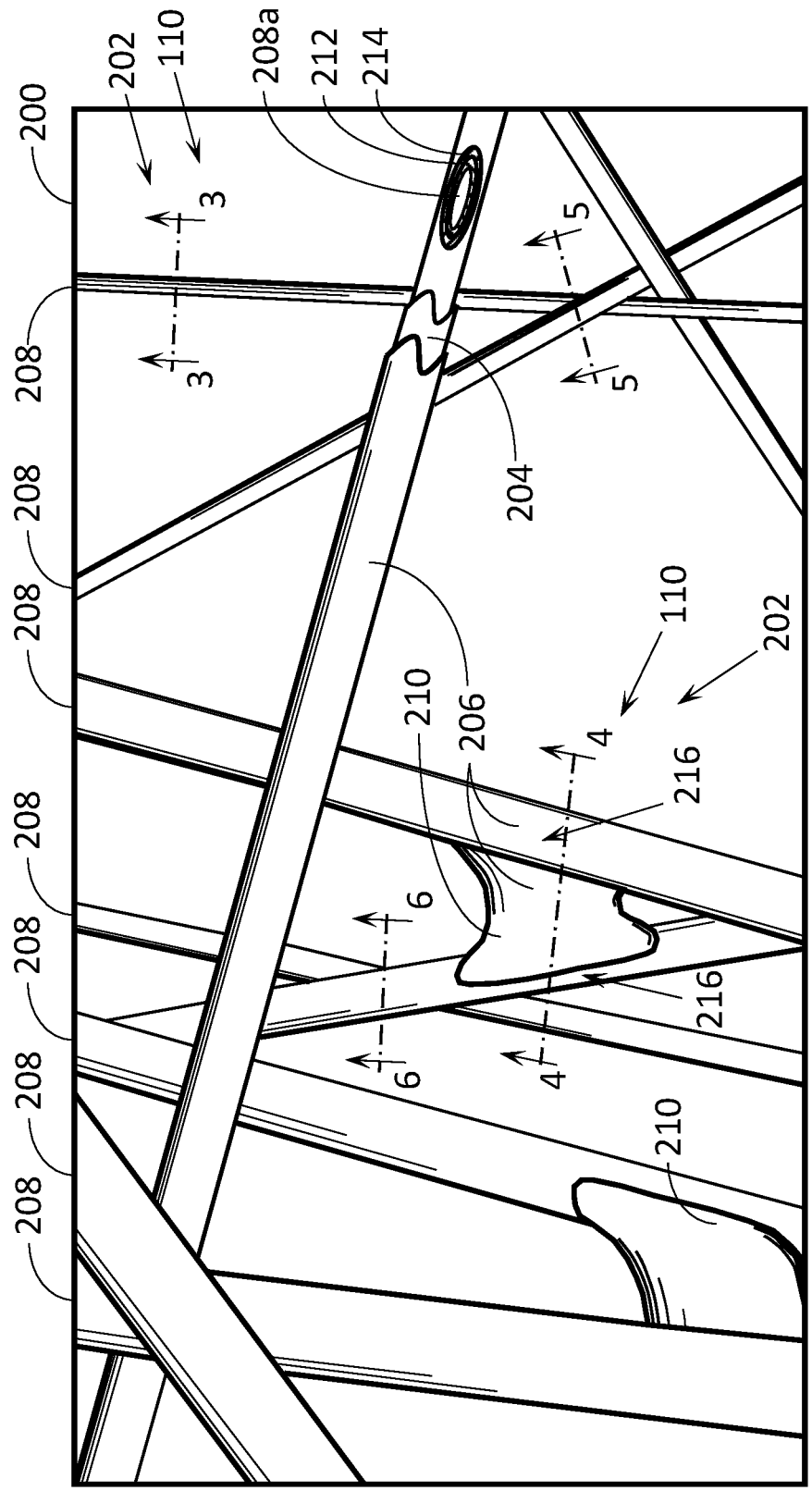
FIG. 2 is a detailed perspective view of the electrically-conductive broad good shown in FIG. 1.

FIG. 2 provides a detailed perspective view 200 of the electrically-conductive broad good 100 showing a dimensionally-stable electrically-conductive nonwoven veil 202 to which one or more metal coatings, e.g., a first metal coating 204 and a second metal coating 206, have been applied, the second metal coating 206 and the first metal coating 204 being relieved on one metal-coated fiber 208a for purposes of further illustration. Those of ordinary skill in the art will appreciate that, although the dimensionally-stable electrically-conductive nonwoven veil 202 comprises a plurality of metal-coated fibers 208 and thus, is electrically-conductive, the sheet resistance of the dimensionally-stable electrically-conductive nonwoven veil 202 is too high to provide effective lightning strike protection in critical areas such as Zone 1A and further, the dimensionally-stable electrically-conductive nonwoven veil 202 lacks the current carrying capability or capacity required by such an application. In one embodiment, the surface resistivity or sheet resistance of the dimensionally-stable electrically-conductive nonwoven veil 202 is between about 0.02 ohms/square (Ω/□) and about 1 ohm/square (Ω/□) or about 20 milliohms/square (mΩ/□) and about 1,000 milliohms/square (mΩ/□). In an embodiment, the first metal coating 204 includes or the first and second metal coatings 204, 206 include enough metal to reduce the sheet resistance of the dimensionally stable electrically-conductive nonwoven veil 202 by a factor of 100, and preferably, 1,000 or more.

Moreover, the metal-coated fibers 208 that are used to form the nonwoven veil 202 form what can be characterized as a discontinuous metal structure which will be described in more detail hereinafter. It is the one or more metal coatings 204, 206 that are applied to the nonwoven veil 202 that make the broad good 100 capable of providing effective lightning strike protection in critical areas such as Zone 1A, i.e., in effect, reducing the sheet resistance and increasing the conductivity of the nonwoven veil 202, and increasing current carrying capability, i.e., ampacity.

Still referring to FIG. 2 and to reiterate, the conductive broad good 100 comprises a conductive nonwoven veil 202, the conductive nonwoven veil 202 comprising a plurality of metal-coated fibers 208 and a binder material 210 that holds or binds together the metal-coated fibers into the conductive nonwoven veil. The conductive broad good 100 also comprises a first metal coating 204 covering a surface of the plurality metal-coated fibers 208 and an exposed surface of the binder material 210 and still further comprises a second metal coating 206 covering the surface of the first metal coating 204.

The plurality of metal-coated fibers 208 are distributed evenly and/or looped randomly throughout the conductive nonwoven veil 202. As shown, each metal-coated fiber 208 is relatively small in diameter compared to its length. For example, in some embodiments, a metal-coated fiber 208 can have a diameter between 1-10 micrometers (μm), while its length can may be 10,000 micrometers (μm) or more. This represents an aspect ratio of 10,000:1 (or greater) to 1,000:1. Further, and in some other embodiments, a metal-coated fiber 208 can be cut or chopped to a length of about 0.1 millimeters (mm) up to about 50.8 millimeters (mm), such as is, for example, shown in FIG. 2. Due to these relative dimensions, the plurality of randomly dispersed, entangled, looped or entwined fibers 208 can appear straight, as illustrated in FIG. 2, due to the enlargement or scale of the detailed perspective view 200.

The fibers of the plurality of metal-coated fibers 208 can be made from one or more of a variety of materials. Those materials of the fibers can be selected from the group consisting of, though not necessarily limited to, aramid (e.g., Kevlar®), carbon, fiberglass, glass, graphene, carbon nanotubes, silicon carbide, nylon, and polyester, other thermoplastics, and combinations thereof. In an embodiment of the present invention, the fibers 208 are carbon fibers as shown herein.

The metal coating on the plurality of metal-coated fibers 208 can comprises one or more of a number of different metals and/or metal alloys, applied in one or more layers, e.g., a first layer 212 and a second layer 214, selected based on resistivity, conductivity, current carrying capability or capacity, ductility, malleability, the ability to be applied to the fibers, e.g., carbon fiber 208a, and/or the ability of the first metal coating 204 to be applied there to as will be appreciated persons of ordinary skill in the art. In an embodiment, the metal coating on the plurality of metal-coated fibers 208 comprises nickel, copper, or silver or a combination thereof or a precious metal alloy including, but not necessarily limited to, nickel and iron (Ni/Fe), copper and tin (Cu/Sn), and phosphor bronze (Cu/Sn/P). For example, and as shown in FIG. 2, the first layer 212 comprises copper and the second layer 214 comprises nickel. Those of ordinary skill in the art will appreciate that the present invention is not limited to a specific metal or metals, or number of layers; but rather, the type of metal(s) and/or the numbers of layers can be varied as desired without departing from the spirit of the present invention.

Figure 4:
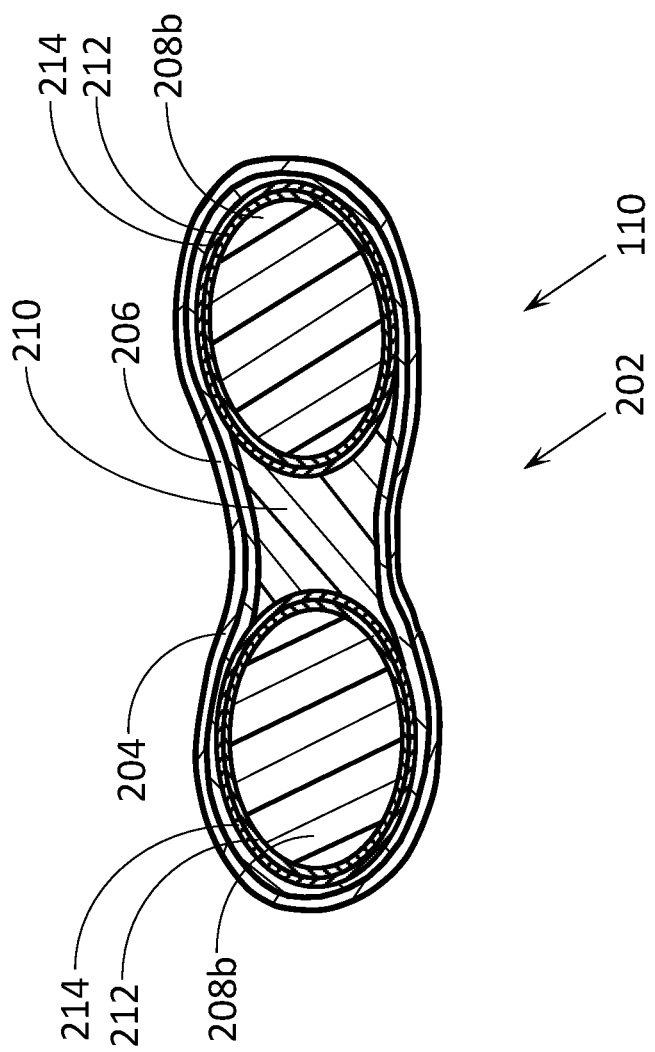
Figure 5:
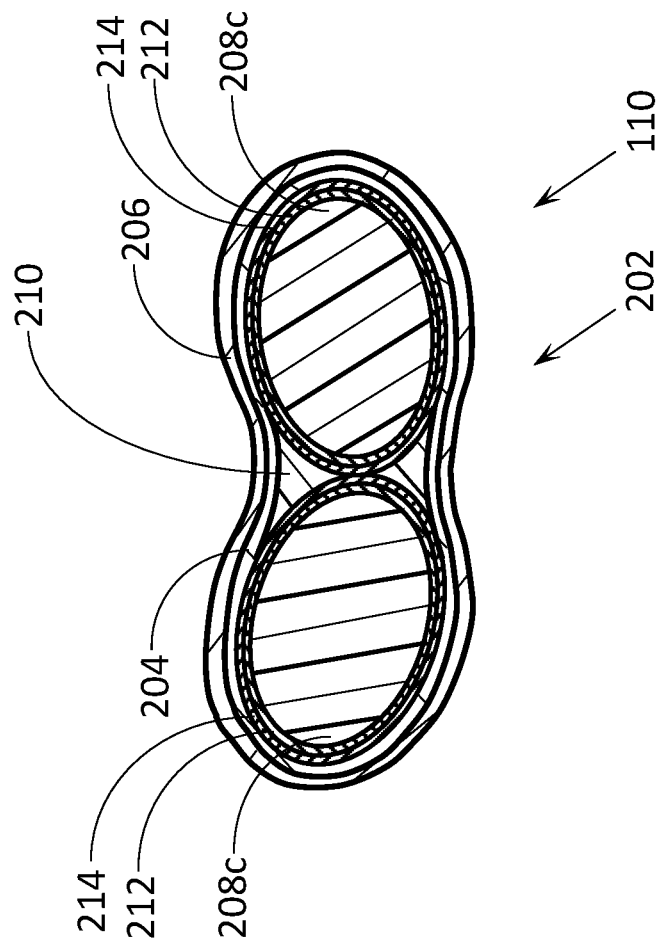
FIG. 5 is a cross sectional view of two fibers, bound by a binder material that are in electrical contact with each other in a dimensionally stable electrically-conductive nonwoven veil, taken along section line 5-5 shown in FIG. 2.
Figure 6:
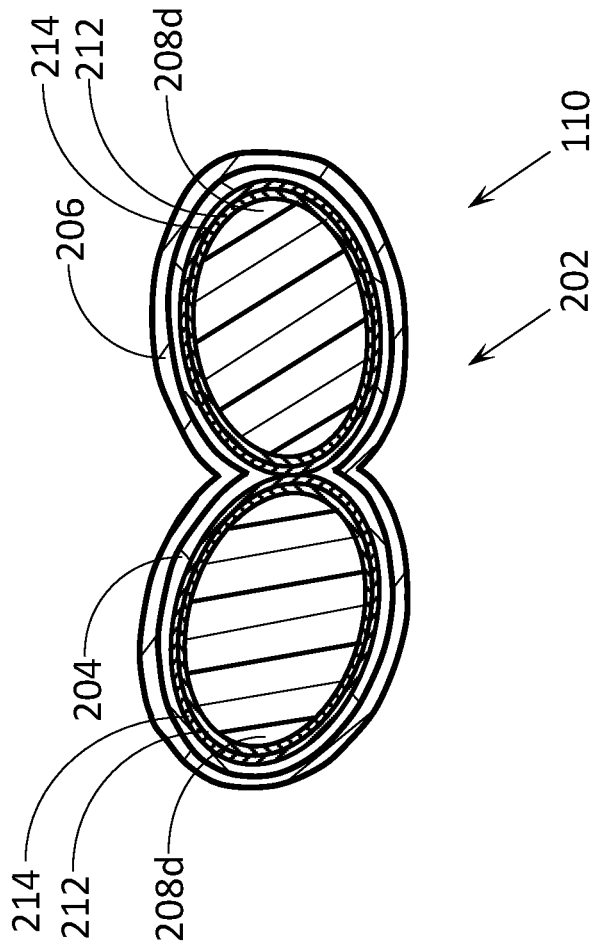
FIG. 6 is a cross sectional view of two fibers, that are in electrical contact with each other in a dimensionally stable electrically-conductive nonwoven veil but not bound together by a binder material, taken along section line 6-6 shown in FIG. 2.

A binder material 210 holds or binds the plurality of metal-coated carbon fibers 208 together at a plurality of proximal points 216, forming the dimensionally stable electrically-conductive nonwoven veil 202. However, those of ordinary skill in the art will appreciate that there are three possible arrangements between two proximal metal-coated carbon fibers comprising a dimensionally stable electrically-conductive nonwoven veil 202 and they are as follows: (a) two metal-coated carbon fibers 208 bound together by the binder material 210 that are not in electrical contact with each other (i.e., the binder material 210 bridging a gap between the two metal-coated carbon fibers 208), (b) two metal-coated carbon fibers bound together by the binder material 210 that are in electrical contact with each other (i.e., the two metal-coated fibers 208 in electrical contact and bound together by the binder material 210), and (c) two metal-coated carbon fibers in electrical contact with each other but not bound together by the binder material 210. FIGS. 4-6 show each of these scenarios, respectively, and each will be described in succession hereinafter.

In one embodiment of the present invention, the binder material 210 is an acid resistant material, a base resistant material, or an acid-and-alkali resistant material. An acid resistant material, as used herein, is a binder material that is resistant to hydrochloric acid (HCl), meaning that when the binder material 210 is contacted with a solution of hydrochloric acid, the binder material resists chemical attack such as dissolving, or softening, which could cause the plurality of bound fibers 208 to come apart, and/or cause the general shape of the dimensionally stable nonwoven veil 202 to be significantly distorted or elongated under strain. An acid-and/or alkali- resistant binder material can selected from the group consisting of, though is not limited to, acrylonitrile butadiene styrene (ABS), acetal, acrylic, cellulose acetate butyrate (CAB), chlorinated polyvinyl chloride (CPVC), ethylene chlorotrifluoroethylene (ECTFE), Fluorosint, polyamide (nylon), polyether ether ketone (PEEK), polyethylene terephthalate (PET), polycarbonate, polypropylene, polysulfone, polyphenylene (PPS), polyvinyl chloride (PVC), polyvinyl alcohol (PVA), polyvinylidene fluoride or polyvinylidene difluoride (PVDF), polytetrafluoroethylene (PTFE), Tecator, styrene acrylic, phenoxy, polyurethane, polyimide, fluorinated ethylene propylene (FEP), cross-linked polyester, styrene acrylic, co-polyester, and ultrahigh molecular weight polyethylene (UHMPE or UHMW), and combinations thereof. In another embodiment, the binder material 210 comprises a butyl styrene, a polyester, a poly vinyl alcohol (PVA), a polyurethane, a phenoxy, or an epoxy. Those of ordinary skill in the art will appreciate that the present invention is not limited to a specific binder material; but rather, the binder material 210 can be varied as desired without departing from the spirit of the present invention.

In an embodiment of the present invention, the conductive nonwoven veil 202 comprising the plurality of metal-coated fibers 208 and the binder material 210 can be purchased in the form of an electrically-conductive nonwoven carbon fiber veil. Suppliers of electrically-conductive nonwoven carbon fiber veils include Technical Fibre Products, headquartered in Burneside, England, and Hollingsworth & Vose, headquartered in Massachusetts. Such veils are typically specified in an aerial weight or a weight per unit area, e.g., grams per square meter ($g/m^2$). Electrically-conductive nonwoven carbon fiber veils are typically available with aerial weights between about 2 grams per square meter ($g/m^2$) and about 50 grams per square meter ($g/m^2$), or up to 400 grams per square meter ($g/m^2$). The former or lesser weight of these nonwoven carbon fiber veils are not intended to carry structural loads, like heavier fabrics used in conventional load-bearing composite structures with aerial weights typically greater than about 70 grams per square meter ($g/m^2$). Rather, these nonwoven carbon fiber veils are used for surface finishing or providing a smooth outer surface for a composite structure with minimal processing and fiber pattern bleed through. A smooth outer surface is particularly import in airfoils, such as airplane wings. Further, minimizing fiber pattern bleed through reduces the amount of paint required to provide a clean esthetic appearance.

One embodiment provides metal coating an electrically-conductive nonwoven carbon fiber veil 202 in a highly conductive, continuous manner that allows for the locating of lightning strike protection in the finishing layer or outermost surface of a composite structure, such as the leading edge of an airplane wing. As will be appreciated by one of ordinary skill in the art, this makes the lightning strike protection more effective by minimizing capacitance, burn through, delamination, etc. In another embodiment, incorporating lightning strike protection in an electrically-conductive broad good 100 allows for minimal finish processing and reduces the amount of paint required to prevent bleed through further reducing capacitance, burn through, delamination, etc.

In one embodiment, the plurality of metal-coated carbon fibers 208 and the binder material 210 have a combined basis weight of approximately 4-100 grams per square meter ($g/m^2$). Again, the sheet thickness can be less than about 0.1 millimeters (0.040 inches), or on the order of 0.075 millimeters (mm) or 75 micrometers (μm).

Referring to FIGS. 2-6, a first metal coating 204 is formed over or envelopes or coats the surfaces or covers the surface of the metal-coated fibers 208 and the binder material 210, that form the dimensionally stable electrically-conductive nonwoven veil 202, followed by a second metal coating 206 over the first metal coating 204. It will be understood that the metal material of the first metal coating 204 is different than that of the second metal coating 206. In one embodiment, the first metal coating 204 covers at least a portion, or at least substantially all, of the surface of the metal-coated fibers 208 and the binder material 210, that form the conductive nonwoven veil 202. It will be understood that the first metal coating 204 need not necessarily cover all of the outer surfaces of the conductive nonwoven veil 202, but that it should provide uniform conductivity. It will be further understood that the second metal coating 206 covers substantially all or completely all of the first metal coating 204. The first and second metal coatings 204, 206 form a highly conductive metal screen 110 having a sheet resistance that is lower than that of conductive nonwoven veil 202 (e.g., the sheet resistance of the conductive nonwoven veil 202 can be between about 20 milliohms/square (mΩ/□) and about 1,000 mΩ/□). Again, in one embodiment, either the first metal coating 204 includes, or the first and second metal coatings 204, 206 include, enough metal to reduce the sheet resistance of the conductive nonwoven veil 202 (as the broad good) by a factor of 100, and preferably, 1,000 or more, i.e., to a broad good having a sheet resistance between about 0.02 milliohms/square (mΩ/□) and about 1 mΩ/□.

Figure 3:
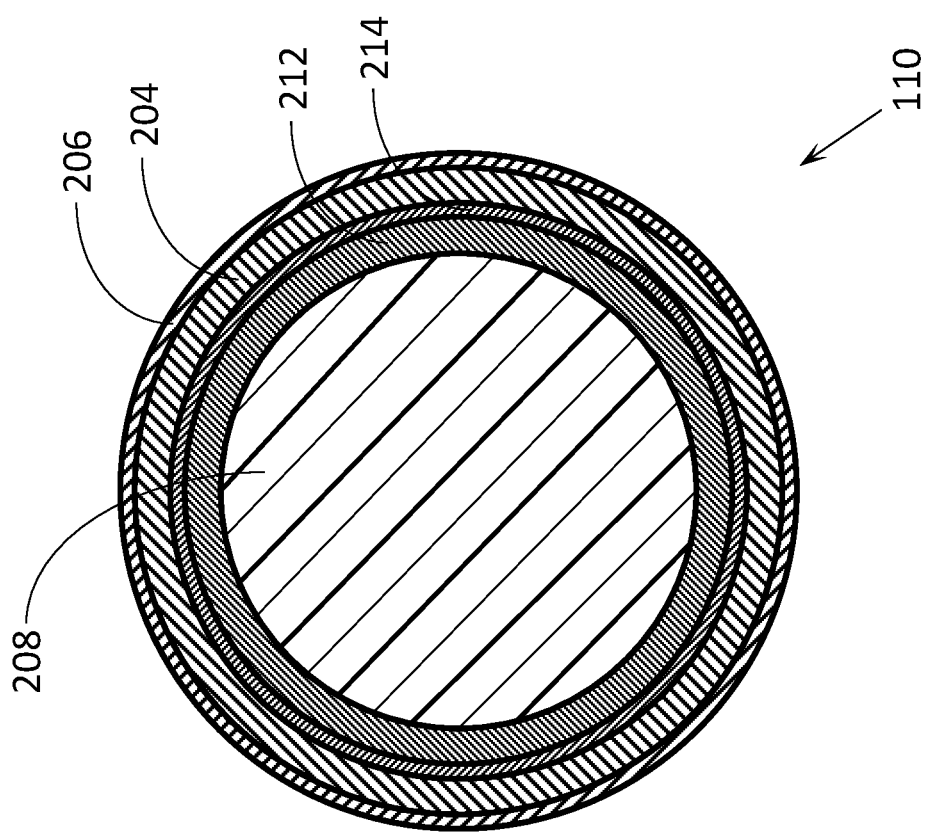
FIG. 3 is a cross sectional view of a fiber taken along section line 3-3 shown in FIG. 2; and, FIG. 4 is a cross sectional view of two fibers, bound by a binder material that are not in electrical contact with each other in a dimensionally stable electrically-conductive nonwoven veil, taken along section line 4-4 shown in FIG. 2.

FIG. 3 illustrates a cross section of a metal-coated strand fiber in accordance with the present invention. More specifically, a first layer of metal 212 and a second layer of metal 214, have been applied to the fiber 208. Again, in an embodiment of the present invention, the metal-coated strand fiber 208 is a carbon fiber that can be part of, for example, a 4-100 gram per square meter (g/m$^2$) electrically-conductive nonwoven carbon fiber veil. In one embodiment of the present invention, the first metal layer 212 comprises copper and the second metal layer 214 comprises nickel. In another embodiment, a metal-coated fiber can have only one metal layer and that layer of metal can comprise nickel, copper, silver or a precious metal alloy, for example, nickel and iron (Ni/Fe), copper and tin (Cu/Sn), or phosphor bronze (Cu/Sn/P), for example.

Referring now to FIG. 4, two metal-coated fibers 208b that are not in direct electrical contact with each other but bound together by the binder material 210 in the dimensionally stable electrically-conductive nonwoven veil 202 are shown. In accordance with the present invention and as will be appreciate by those of ordinary skill in the art from the teachings contained herein, the first metal coating 204 forms an electrically-conductive pathway or bridge over the binder material 210 and between the two metal-coated carbon fibers 208b. The second metal coating 206 forms a further electrically-conductive pathway over the binder material 210 and between the two metal-coated fibers 208b thereby further increasing the conductivity and the ampacity of the plurality of metal-coated carbon fibers 208.

Referring now to FIG. 5, two metal-coated carbon fibers 208c that are in direct electrical contact with each other and bound together by the binder material 210 in the dimensionally stable electrically-conductive nonwoven veil 202 are shown. In accordance with the present invention and as will also be appreciate by those of ordinary skill in the art from the teachings also contained herein, the first metal coating 204 forms an electrically-conductive pathway over the binder material 210 and between the two metal-coated carbon fibers 208c that are in electrical contact with each other and bound together by the binder material 210 thereby reducing the contact resistance between the two metal-coated carbon fibers 208c. The second metal coating 206 forms a further electrically-conductive pathway over the binder material 210 and between the two metal-coated fibers 208c that are in electrical contact with each other and bound together by the binder material 210 and further reduces the contact resistance between the two metal-coated carbon fibers 208c.

Referring now to FIG. 6, two metal-coated fibers 208d that are in direct electrical contact with each other but not bound together by the binder material 210 are shown. In accordance with the present invention and as will be further appreciate by those of ordinary skill in the art from the teachings likewise contained herein, the first metal coating 204 reduces the contact resistance between the two metal-coated carbon fibers 208d that are in electrical contact with each other but are not bound together by the binder material 210. The second metal coating 206 further reduces the contact resistance between the two metal-coated carbon fibers 208d that are in electrical contact with each other but are not bound together by the binder material 210.

Thus, as shown in and described in conjunction with FIGS. 3-6, the second metal coating 206 further increases the conductivity and the ampacity of the plurality of metal-coated carbon fibers 208 and the electrically-conductive broad good 100. In one embodiment of the present invention, the first metal coating 204 comprises copper and the second metal coating 206 comprises nickel. In another embodiment, the first metal coating comprises nickel and the second metal coating 206 can be eliminated or omitted.

In some embodiments, the basis weight of the electrically-conductive broad good 100 is more than 2 grams per square meter (g/m$^2$) or less than 160 g/m$^2$, or between about 2 g/m$^2$ and about 160 g/m$^2$.

Those of ordinary skill in the art will also appreciate that other metals may be used without departing from the spirit of the present invention. In one embodiment, a metal that exhibits excellent electrical conductivity and ductility is preferred for either or both the first and second metal coatings 204, 206. Excellent electrical conductivity is associated with low resistivity and greater current carrying capability and, thereby, increases the lightning strike protection capabilities of the electrically-conductive broad good 100. A more ductile metal is advantageous, allowing the electrically-conductive broad good 100 to more readily follow complex or curved contours in composite panels forming the airframe and/or exterior skin, e.g., fuselage, wings, etc., of an aircraft.

Some metals, such as copper, silver, some aluminums, certain alloys, and some steels, with excellent conductivity and ductility can galvanically interact with the carbon fiber in other layers of a composite panel, affecting the structural strength of the carbon fiber. Some metals, such as copper, silver, some aluminums, certain alloys, and some steels, also tend to corrode in salt environments or corrode galvanically with carbon or oxidize almost instantly in air, which can increase their resistivity and, thereby, reduce and/or compromise the lightning strike protection capability of the electrically-conductive broad good 100. This is of particular concern because the electrically-conductive broad good 100 allows for the location of lightning strike protection in the finishing layer or outermost surface of a composite structure, such as an airplane wing, where oxidation or corrosion is more likely to occur.

The present invention addresses these and other possible concerns by providing a continuous, uninterrupted, second metal coating 206 over the first metal coating 204 or a metal overlay that resists corrosion. The second metal coating 206 prevents the metal material of certain first metal coatings 204 from galvanically interacting with the carbon fiber in other layers of a composite panel as well as preventing the exposure of the first metal coating 204 to external elements. Further, there is no galvanic interaction between the nickel and the carbon fiber in other layers of a composite panel. Nickel is also corrosion resistant in salt environments and does not oxidize readily in air. This further allows for the location of lightning strike protection in the finishing layer or outermost surface of a composite structure, such as an airplane wing.

Further, in one embodiment, the first metal coating 204 need not necessarily completely coat the metal-coated fibers 208 in the conductive nonwoven veil 202, some gaps in the first metal coating 204 or portions of the first metal coating 204 that do not completely cover the metal-coated fibers 208 in electrically-conductive nonwoven veil 202 can be tolerated. The formation of a highly conductive metal screen 110 that follows the shape of the fibers 208 in the electrically-conductive nonwoven veil 202 can still be sufficient to provide the conductivity necessary for a particular application. Moreover, the second metal coating 206 can function to bridge any gap or discontinuity in the first metal coating 204 thereby furthering the formation of the highly conductive metal screen 110.

Similarly, in one embodiment, the second metal coating 206 need not necessarily completely coat the first metal coating 204 and/or fibers 208 in the electrically-conductive nonwoven veil 202, some gaps in the second metal coating 206 can also be tolerated. Again, the formation of a highly conductive metal screen 110 that follows the shape of the fibers 208 in the electrically-conductive nonwoven veil 202 can still be sufficient enough to provide the conductivity required for a particular application and the second metal coating 206 can still be sufficient enough to prevent significant galvanic interaction with other layers of a composite panel.

In one embodiment, the first metal coating 204 comprises (i) an electrolessly plated and electroplated (EP) metal, e.g., copper or nickel, or (ii) electroplated (EP) metal, e.g., nickel. Although nickel is corrosion and wear resistant, nickel is not typically thought of as being particularly ductile. However, for example, nickel sulfamate based electroplated (EP) nickel is more ductile than nickel sulfate based electroplated (EP) nickel, i.e., Watts nickel, nickel sulfamate being similar to nickel sulfate except that one of the hydroxyl groups has been replaced by an amido group. See Milan Paunovic & Mordechay Schlesinger, MODERN ELECTROPLATING (2010), incorporated by reference herein in its entirety. In one embodiment of the present invention, the second metal coating 206 comprises a nickel-sulfamate based electroplated (EP) nickel.

Essentially, by using two metal coatings 204, 206 with dissimilar, complimentary and/or synergistic characteristics, provides an electrically-conductive broad good 100 having the benefits of both metals. For example, the first metal coating 204 comprising a highly conductive, ductile metal, such as copper or silver, can operate to prevent a less ductile second metal coating material, such as nickel sulfamate based electroplated (EP) nickel or nickel sulfate based electroplated (EP) nickel, from reaching its yield point. Thus, the electrically-conductive broad good 100 exhibits excellent conductivity, with low associated resistance, and enhanced ductility and corrosion resistance, while being particularly suited for used in carbon composite structures and, in particular, in the outer most layers thereof Although FIGS. 2-6 and the accompanying description have detailed numerous embodiments of the present invention, several operative principles will be become apparent to one of ordinary skill in the art.

It is well understood by a person of ordinary skill in the art that for a given metal-coated fiber 208 size, the greater the basis weight of the dimensionally stable electrically-conductive nonwoven veil 202, the greater the number or plurality of metal-coated fibers 208 in a unit volume of the electrically-conductive broad good 100, and the lesser the space between fibers 208; thereby, in terms of shielding effectiveness, the greater the frequency bandwidth and/or the greater the highest frequency of shielding coverage provided by the electrically-conductive broad good 100. In an embodiment, the metal-coated fibers 208 are carbon fibers that are coated with copper and then nickel, the basis weight of the plurality of metal-coated carbon fibers 208 and the binder material 210 is about 10-40 grams per square meter (g/m$^2$), the basis weight of the electrically-conductive broad good 100 is less than 80 grams per square meter (g/m$^2$), and the shielding effect provided by the electrically-conductive broad good 100 from 1-8.5 gigahertz (GHz) is at least about 40, 50, 60, 70, or 80 decibels (dB). Further, in comparison to a dimensionally-stable electrically-conductive nonwoven veil 202 as described hereinabove, the electrically-conductive broad good 100 having a basis weight of less than 80 grams per square meter (g/m$^2$) of which 5-20 grams per square meter (g/m$^2$) is associated with carbon fibers that are coated with copper and then nickel, i.e., as much as 60 grams per square meter (g/m$^2$) associated with the first metal coating 204 comprising copper and the second metal coating 206 comprising nickel, the shielding is improved by about 20 decibels (dB) on the low frequency end, i.e., 1 gigahertz (GHz), and about 10 decibels (dB) on the high frequency end, i.e., 8.5 gigahertz (GHz), or about 10-20 decibels (dB).

Referring also to FIGS. 1-6, a person of ordinary skill in the art will appreciate that, generally, as the basis weight of the first and second metal coatings 204, 206 are increased in the electrically-conductive broad good 100, the resistance across the width 16 and length 14, i.e., the sheet resistance in terms of ohms per square unit ($\Omega/\square$), of the electrically-conductive broad good 100 is decreased. Further, as the weight of the first and second metal coatings 204, 206 are increased, the current carrying capability of the electrically-conductive broad good 100 is generally increased. This is particularly important in terms of providing lightning strike protection as is the aforementioned highly conductive metal screen 110. It will be appreciated that pragmatically, the thickness of the first and second metal coatings 204, 206 are not used to specify the sheet resistance as described above as they are on the micron level, i.e., $10^{-6}$ meters, and are more difficult to readily measure. Rather, the measure is the relative weight per unit area of the metal coatings 204, 206; again, typically given in grams per square meter (g/m$^2$).

Further, with respect to shielding effectiveness, and as previously shown and discussed, the relative spacing of the plurality of metal-coated fibers 208 is what determines the shielding effectiveness at a particular frequency. For example, as the space between a plurality of fibers 208 is decreased or the basis weight of the dimensionally stable electrically-conductive nonwoven veil 202 is increased, the shielding effectiveness at higher frequencies is also increased.

Those of ordinary skill in the art will appreciate that the first metal coating comprising copper can vary between a basis weight of approximately 10-50 g/m$^2$, and the second metal coating comprising nickel can vary within a basis weight of approximately 5-20 g/m$^2$ to provide differing levels of lightning strike protection and/or electromagnetic shielding as desired.

In one embodiment of the present invention, a sheet resistance of 20 milliohms per square unit (m$\Omega/\square$) is specified for providing Zone 1A lightning protection, while in another embodiment, a sheet resistance of 40 m$\Omega/\square$ is specified for providing Zone 1A lightning protection—at the time of this writing, there is no one universal or agreed upon sheet resistance specification for Zone 1A lightning strike protection, for example. The same is true for the other designated lightning strike zones. Those of ordinary skill in the art will appreciate that different manufacturers of various types of aircraft can have different sheet resistance specifications, each of can be used to select a broad good in accordance with principles of the present invention, based, in part, on that particular company's interpretation of what is necessary for their lightning protection needs, e.g., implementation specifics, safety margin, etc.

Referring once again to FIG. 1, as described, broad good 10 may be used in the construction of various primary and secondary structures in aerospace applications, such as composite panels forming the airframe and/or exterior skin, e.g., fuselage, wings, etc., of an aircraft. Again, when used in these applications, broad good 10 provides lightning strike protection and/or shields associated avionics and electronics from external electromagnetic interference. When so used, broad good 10 channels lightning across the exterior surface of the aircraft protecting and/or shielding.

In some embodiments of the present invention, an electrically-conductive broad good 100 further comprises a resin system and the electrically-conductive broad good 100 is pre-impregnated with the resin system. A resin system includes a polybismaleimide (BMI), an epoxy, a polyamide, or a thermoplastic. In one embodiment, the resin system can be applied to the electrically-conductive broad good 100 using techniques and/or processes know to those of skill in the art. Further, in another embodiment, the resin system can be applied to the electrically-conductive broad good 100 without the use of a carrier material or "scrim."

Further, the processes of chemical vapor deposition (CVD), electroless plating (EL), and/or electroplating (EP), or any combination thereof, can be used to coat the dimensionally stable electrically-conductive nonwoven veil 202 with the first and second metal coatings 204, 206. An article entitled *Tin-Palladium Catalysts for Electroless Plating* by Gerald A. Krulik, Gerald A. Krulik, *Tin-Palladium Catalysts for Electroless Plating,* 26 Platinum Metals Review 58-64 (1982), details a process for electroless plating (EP) and is incorporated herein by reference in its entirety.

While various embodiments of an electrically-conductive broad good offering lightning strike protection have been illustrated by the foregoing description and have been described in considerable detail, it is not intended to restrict or in any way limit the scope of the appended claims to such detail. Additional advantages and modifications will become readily apparent to those skilled in the art.

What is claimed is:

1. An electrically-conductive broad good, comprising:
   (A) a dimensionally-stable electrically-conductive nonwoven veil comprising:
      (i) a plurality of metal-coated fibers comprising a fiber selected from the group consisting of aramid, carbon, fiberglass, glass, graphene, carbon nanotubes, silicon carbide, nylon, polyester, thermoplastics, and combinations thereof, and one or more metal layers applied to the fibers, the metal-coated fibers having a staple length looped randomly throughout the nonwoven veil, wherein the metal of the one or more metal layers is selected from the group consisting of nickel, copper, silver, an alloy of nickel and iron (Ni/Fe), an alloy of copper and tin (Cu/Sn), an alloy of phosphor bronze (Cu/Sn/P), and a combination thereof, and
      (ii) a binder material binding to an outer surface of the one or more metal layers to bind the plurality of metal-coated fibers together at a plurality of proximal points, to form the dimensionally-stable electrically-conductive nonwoven veil; and
   (B) a first metal coating contacting directly and covering substantially all of the surfaces of substantially all the plurality of metal-coated fibers, and of the binder material, wherein the first metal coating forms an electrically-conductive pathway over the surfaces of the binder material and the plurality of metal-coated fibers that are bound together by the binder material; and
   (C) an optional second metal coating covering the surface of the first metal coating.

2. The electrically-conductive broad good of claim 1, wherein the staple length of the fibers is at least 0.1 millimeters (mm) and up to 50.8 millimeters (mm).

3. The electrically-conductive broad good of claim 1, wherein the electrically-conductive broad good has a width of at least 12 inches, and up to 65 inches.

4. The electrically-conductive broad good of claim 1, wherein the binder material is selected from the group consisting of a butyl styrene, a polyester, a poly vinyl alcohol (PVA), a polyurethane, a phenoxy, and an epoxy, and a combination thereof.

5. The electrically-conductive broad good of claim 1, wherein the basis weight of the electrically-conductive broad good is up to 160 g/m$^2$, and a sheet resistance of the electrically-conductive broad good is at least 5 mΩ/□.

6. The electrically-conductive broad good of claim 5, wherein the sheet resistance is at least 10 mΩ/□.

7. The electrically-conductive broad good of claim 1, wherein the metal of the metal-coated fibers is at least one of (i) nickel and (ii) copper and then nickel, and the basis weight of the nonwoven veil is at least 10 g/m$^2$ and up to 40 g/m$^2$ the basis weight of the electrically-conductive broad good is less than 80 g/m$^2$, and the sheet resistance of the electrically-conductive broad good is less than 5 mΩ/□.

8. The electrically-conductive broad good of claim 1, wherein the dimensionally stable electrically-conductive nonwoven veil has a first sheet resistance and the electrically-conductive broad good having a second sheet resistance associated with the first metal coating having been applied to the dimensionally stable electrically-conductive nonwoven veil, wherein the first metal coating includes a coating of metal sufficient so that the second sheet resistance is less than the first sheet resistance by a factor of 1,000 or more.

9. The electrically-conductive broad good of claim 1, wherein the second metal coating provides at least one of (a) forms a further electrically-conductive pathway over the binder material of the nonwoven veil and between the at least two metal-coated fibers that are bound together by the binder material but are not in electrical contact, (b) forms a further electrically-conductive pathway over the binder material and between the at least two metal-coated fibers that are in electrical contact with each other and are bound together by the binder material, to further reduce the contact resistance between the at least two metal-coated fibers, and (c) further reduces the contact resistance between the at the least two metal-coated fibers that are in electrical contact with each other but are not bound together by the binder material; and
   wherein the second metal coating further increases at least one of the conductivity and the ampacity of the plurality of metal-coated carbon fibers.

10. The electrically-conductive broad good of claim 1, wherein the second metal coating comprises an electroplated (EP) metal consists of a nickel sulfamate based electroplated (EP) nickel, and covers the surface of the first metal coating.

11. The electrically-conductive broad good of claim 1, wherein the first metal coating comprises copper and contributes a basis weight of approximately 10-50 g/m$^2$ to the resulting electrically-conductive broad good, and the second metal coating that comprises nickel and contributes a basis weight of approximately 5-20 g/m² to the resulting electrically-conductive broad good.

12. The electrically-conductive broad good of claim 1, wherein a shielding effect provided by the electrically-conductive broad good is at least 1 GHz and up to 8.5 GHZ, and is at least 40 decibels (dB), including at least 50 dB.

13. The electrically-conductive broad good of claim 1, further comprising a resin system, the electrically-conductive broad good pre-impregnated with the resin system.

14. The electrically-conductive broad good of claim 13, wherein the resin system is selected from the group consisting of a polybismaleimide (BMI), an epoxy, a polyamide, a thermoplastic, and a combination thereof.

15. The electrically-conductive broad good of claim 1, wherein the nonwoven veil has at least one of (a) the binder material binding at least two metal-coated fibers together that are not in electrical contact with each other, (b) the binder material binding at least two metal-coated fibers together that are in electrical contact with each other, and (c) at least two metal-coated fibers in electrical contact with each other but not bound together by the binder material, and the first metal coating provides at least one of (d) forms an electrically-conductive pathway over the exposed surfaces of the binder material and between the at least two metal-coated fibers that are bound together by the binder material but not in electrical contact, (e) forms an electrically-conductive pathway over the exposed surfaces of the binder material and between the at least two metal-coated fibers that are in electrical contact with each other and bound together by the binder material and reduces the contact resistance between the at least two metal-coated fibers, and (f) reduces the contact resistance between the at least two metal-coated fibers that are in electrical contact with each other but are not bound together by the binder material.

16. The electrically-conductive broad good of claim 1, useful as a surface material in the construction of an aircraft, wherein electrically-conductive broad good either withstands or prevents structural damage to the aircraft surface from direct and indirect effects of a 200,000-ampere lightning strike that either directly attaches to the aircraft or occurs nearby, and can endure an action integral of $2.0 \times 10^6$-$2.5 \times 10^6$ amps²-second.

17. The electrically-conductive broad good of claim 1, wherein the metal of the metal-coated fibers is nickel and copper, the fibers are carbon fibers, and the first metal coating covers substantially all the surface of the plurality of metal-coated fibers and the binder material.

18. The electrically-conductive broad good of claim 1, wherein the optional second metal coating, which covers the surface of the first metal coating, contacts directly the surface of the first metal coating.

* * * * *